United States Patent [19]
Tsay et al.

[11] Patent Number: 5,461,576
[45] Date of Patent: Oct. 24, 1995

[54] ELECTRONIC DESIGN AUTOMATION TOOL FOR THE DESIGN OF A SEMICONDUCTOR INTEGRATED CIRCUIT CHIP

[75] Inventors: Ren-Song Tsay, Palo Alto; Chwen-Cher Chang, Fremont, both of Calif.

[73] Assignee: Arcsys, Inc., Sunnyvale, Calif.

[21] Appl. No.: 115,995

[22] Filed: Sep. 1, 1993

[51] Int. Cl.$^6$ .............................. G06F 19/00; G06F 17/00
[52] U.S. Cl. .......................... 364/490; 364/488; 364/489; 364/491; 364/578
[58] Field of Search .................................. 364/488, 489, 364/490, 491, 578

[56] References Cited

U.S. PATENT DOCUMENTS

| | | | |
|---|---|---|---|
| 4,263,651 | 4/1981 | Donath et al. | 364/490 |
| 4,698,760 | 10/1987 | Lembach et al. | 364/490 |
| 5,164,907 | 11/1992 | Yabe | 364/489 |
| 5,168,455 | 12/1992 | Hooper | 364/490 |
| 5,218,551 | 6/1993 | Agrawal et al. | 364/490 |
| 5,237,514 | 8/1993 | Curtin | 364/489 |

OTHER PUBLICATIONS

Bahar et al., "An ADD-based Algorithm for shortest path Back-Tracking . . . ", 1994 4th Great Lakes Symposium, VLSI (IEEE pub).
Ciesielski, "Layer Assignment for VLSI Interconnect Delay Minimalization", IEEE Trans on CAD for IC's; Jun. '89, vol. 8 No. 6, pp. 702–707.
Burstein, Youssef, "Timing Influenced Layout Design", 22nd Design Automation Conf., IEEE, 1985, pp. 124–130.
Sadowska & Lin, "Timing Driver Placement", 1989 Int'l CAD Conf, IEEE, pp. 94–97.
Vanbekbergen, Goossens, De Man, "Specification & Analysis of timing constraints in Signal Transition Graphs", 1992 IEEE Euro. Des. Auto. Conf pp. 302–306.
Cong et al., "Performance-Driven Global Routing of Cell Based ICs", 1991 Inf'l Conf on Computer Design (ICCD) (IEEE pub) pp. 170–173.
Steven Teig, Randall L. Smith and John Seaton, in "Timing-Driven Layout of Cell-Based ICs", Design Automation Guide, 1987, pp. 94–101.
A. H. Chao, E. M. Nequist & T. D. Vuong, "Direct Solution of Performance Constraints During Placement," IEEE 1990 Custom IC Conference, pp. 27.2.1–4.
Peter S. Hauge, Ravi Nair and Ellen J. Yoffa, "Circuit Placement for Predictable Performance," Proceedings of ICCAD '87, Nov. 9–12, 1987, pp. 88–91.
R. B. Hitchcock, Sr., et al., "Timing Analysis of Computer Hardware", IBM Journal of Res. Dev., vol. 26, No. 1, Jan. '82, pp. 100–105.
Michael A. B. Jackson, et al., "Performance-Driven Placement of Cell Based IC's", Dept. of Electrical Engineering, UC Berkeley, CA 94720.

*Primary Examiner*—Kevin J. Teska
*Assistant Examiner*—Tyrone V. Walker
*Attorney, Agent, or Firm*—Thomas E. Schatzel

[57] ABSTRACT

An electronic design automation tool embodiment uses a single slack graph structure throughout a process to provide communication between a placer (performing placement) and a timing constraint generator (performing slack distribution). The tool includes a slack graph generator, a timing calculator, a timing analyzer, a timing constraint generator and a net bounding box generator. A list of net constraints and a list of complete path constraints are fed to the slack graph generator during operation. Timing calculations from the delay calculator and zero net RC delays from a clustering process in a placer also provide input to the slack graph generator. The list of net constraints, a list of pin-to-pin constraints and a set of specifications for system clocking are input to the timing analyzer. The timing constraint generator receives a composite slack graph from the timing calculator, slack graph generator and timing analyzer. A refined slack graph is output to the net timing constraint generator for mincut placement and placement on an iterative basis. The net timing constraint can be presented in many format, such as limit on net bounding box.

7 Claims, 5 Drawing Sheets

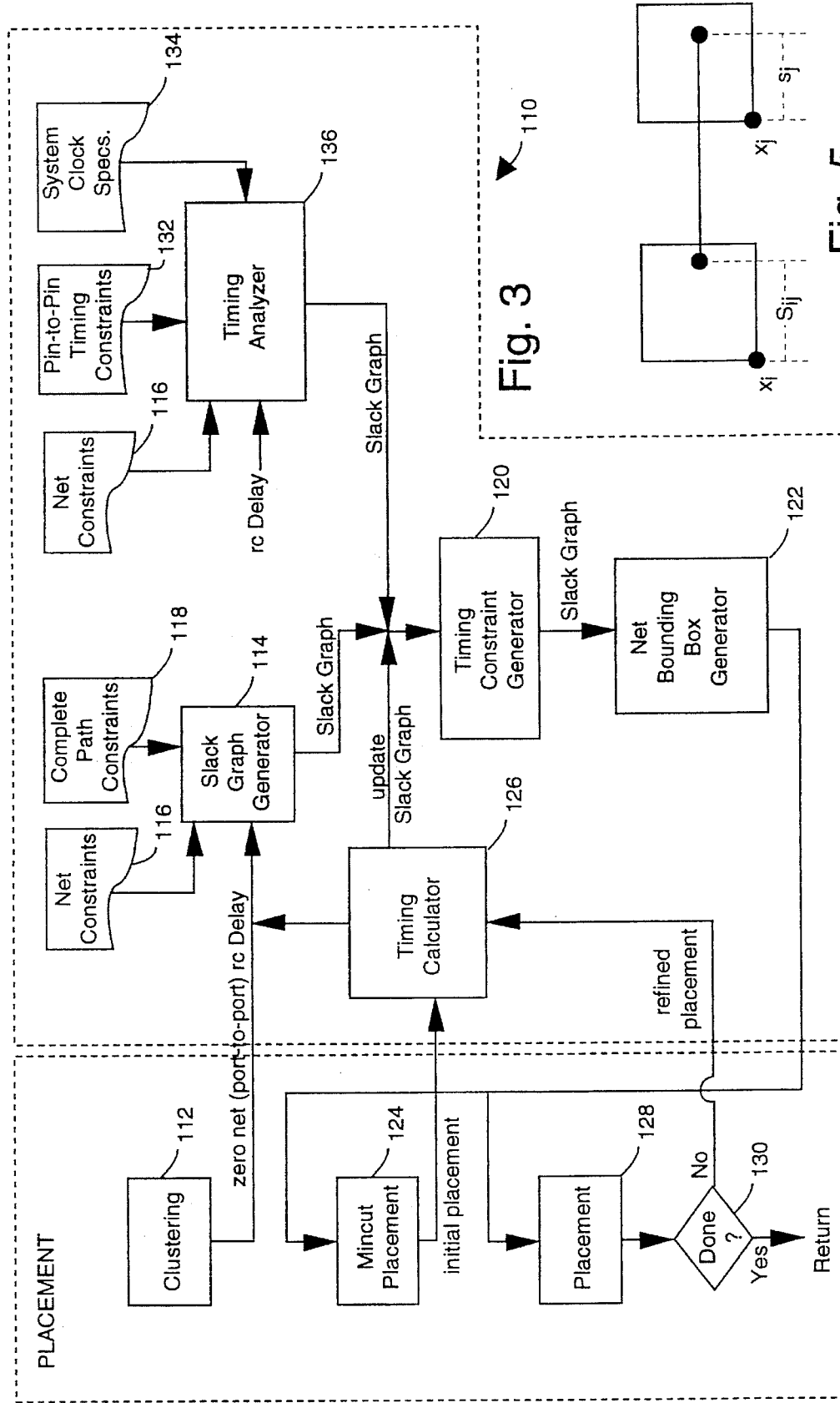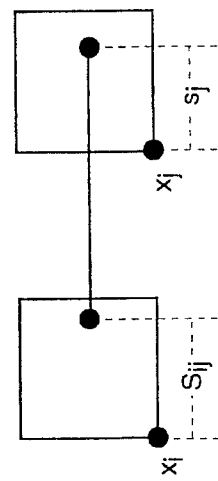

ELECTRONIC DESIGN AUTOMATION TOOL FOR THE DESIGN OF A SEMICONDUCTOR INTEGRATED CIRCUIT CHIP

BACKGROUND OF THE INVENTION

1. Field of the Invention

The present invention relates generally to automatic integrated circuit placement and routing tools, and more particularly to timing-driven layout algorithms for standard-cell and gate-array design.

2. Description of the Prior Art

Traditional approaches for timing-driven layout include a net constraint approach and a path constraint approach.

In the net constraint approach, a user specifies fixed net constraint values across a design to guide a layout program. The strength of this approach is that it generally does not require much overhead in the run time, and thus commonly referred to as being a "fast" approach. However, its weaknesses include a difficulty in providing "good" net constraint values, and an inflexibility in sharing timing resources among several nets. A timing resource is a portion of the overall delay to be distributed through a physical layout. Different paths usually share common nets, thus complicating the problem. A burden is placed on a designer to divide path delays into net delays, albeit without much information as how the nets will eventually be physically laid out. This approach also includes the problem that such net delay constraints become fixed constraints, and cannot be altered during layout. In a case where one of the nets in the path takes up a shorter than expected delay, there is no way to share this extra timing resource with other nets in the same path that have run into difficulty in meeting their own respective constraints.

Due to such severe drawbacks, the common way to use this approach involves having the designers constrain several timing critical nets, and hope that the overall timing target can still be met. In older semiconductor fabrication technology this was not a severe problem, the feature size of the silicon was larger and the parasitic delays, the so-called layout or interconnect delays, were smaller. If a designer was well disciplined during the logic design phase in taking the timing into consideration, even this approach can suffice for some lesser timing-restrictive circuits. However, as technology advances and the feature size of the silicon process becomes smaller, e.g. the sub-micron range, parasitic delays are becoming a principal timing concern, and traditional net constraint approaches are inadequate.

The path constraint approach, tries to constrain the whole path, not individual nets, to meet a timing target, represented as path delays. The relationships among different timing paths are complicated, and even a simple move of a cell location during the running of a layout program can affect the delays of many nets. This, in turn, can require a reevaluation of the delays on numerous paths. The extra overhead required for this kind of delay evaluation during a single run of layout can provoke millions of cell movements. This is why the number of path constraints has to be limited to a small number to make this approach practical, e.g., where a solution can be found in finite time.

Due to such drawbacks, designers commonly only constrain several of what they think may be the most critical of paths. However, there is no guarantee that these constraints will be satisfied by the layout program. Other unconstrained paths, which may comprise over 90% of the total paths, may not remain well behaved and can become new critical paths.

SUMMARY OF THE INVENTION

It is therefore an object of the present invention to provide an electronic design automation tool capable of concurrently handling all path timing constraints in an integrated circuit chip design.

It is a further object of the present invention to provide an electronic design automation tool that has a single slack graph structure used throughout that provides communication between a placer and a timing constraint generator.

Briefly, an exemplary embodiment of the present invention is an electronic design automation tool that uses a single slack graph structure throughout a process to provide communication between a placer (performing placement) and a timing constraint generator (performing slack distribution). The tool includes a slack graph generator, a timing calculator, a timing analyzer, a timing constraint generator and a net bounding box generator. A list of net constraints and a list of complete path constraints are fed to the slack graph generator during operation. Timing calculations from the delay calculator and zero net RC delays from a clustering process in a placer also provide input to the slack graph generator. The list of net constraints, a list of pin-to-pin constraints and a set of specifications for system clocking are input to the timing analyzer. The timing constraint generator receives a composite slack graph from the timing calculator, slack graph generator and timing analyzer. A refined slack graph is output to the net timing constraint generator for mincut placement and placement on an iterative basis. The net timing constraint can be presented in many format, such as limit on net bounding box.

An advantage of the present invention is that an electronic design automation tool is provided that is capable of covering all timing paths in a design by using a slack graph.

An advantage of the present invention is that an electronic design automation tool is provided that is very flexible and can be applied to either a partially placed or even an unplaced design.

Another advantage of the present invention is that an electronic design automation tool is provided in which the same concept can be applied to other applications for timing optimization, such as routing, Sizing and logic synthesis.

An advantage of the present invention is that an electronic design automation tool is provided in which path constraints can be easily derived with many commercially or academically available timing analyzers, Given a circuit's timing specification, e.g., the operating frequency, the input signal arrival times, etc.. A further advantage of the present invention is that an electronic design automation tool is provided in which all path constraints are treated for complete coverage of the timing specification of a design, thus eliminating the possibility of creating new critical paths when not considering all the paths.

A still further advantage of the present invention is that an electronic design automation tool is provided in which an adaptive feedback and divide-and-conquer approach is used to iteratively and Globally optimize the distribution of the path timing resource into individual nets, thus taking the advantage of the fast, net constraint based approach in achieving a shorter run time.

These and other objects and advantages of the present invention will no doubt become obvious to those of ordinary skill in the art after having read the following detailed description of the preferred embodiment that is illustrated in the various drawing figures.

IN THE DRAWINGS

FIG. 3 is a block diagram of a timing-driven placement embodiment of the present invention;

FIG. 5 shows the relationship between xi, xj, $s_j$, and $S_{ij}$; and

DETAILED DESCRIPTION OF THE PREFERRED EMBODIMENT

Figure 1:
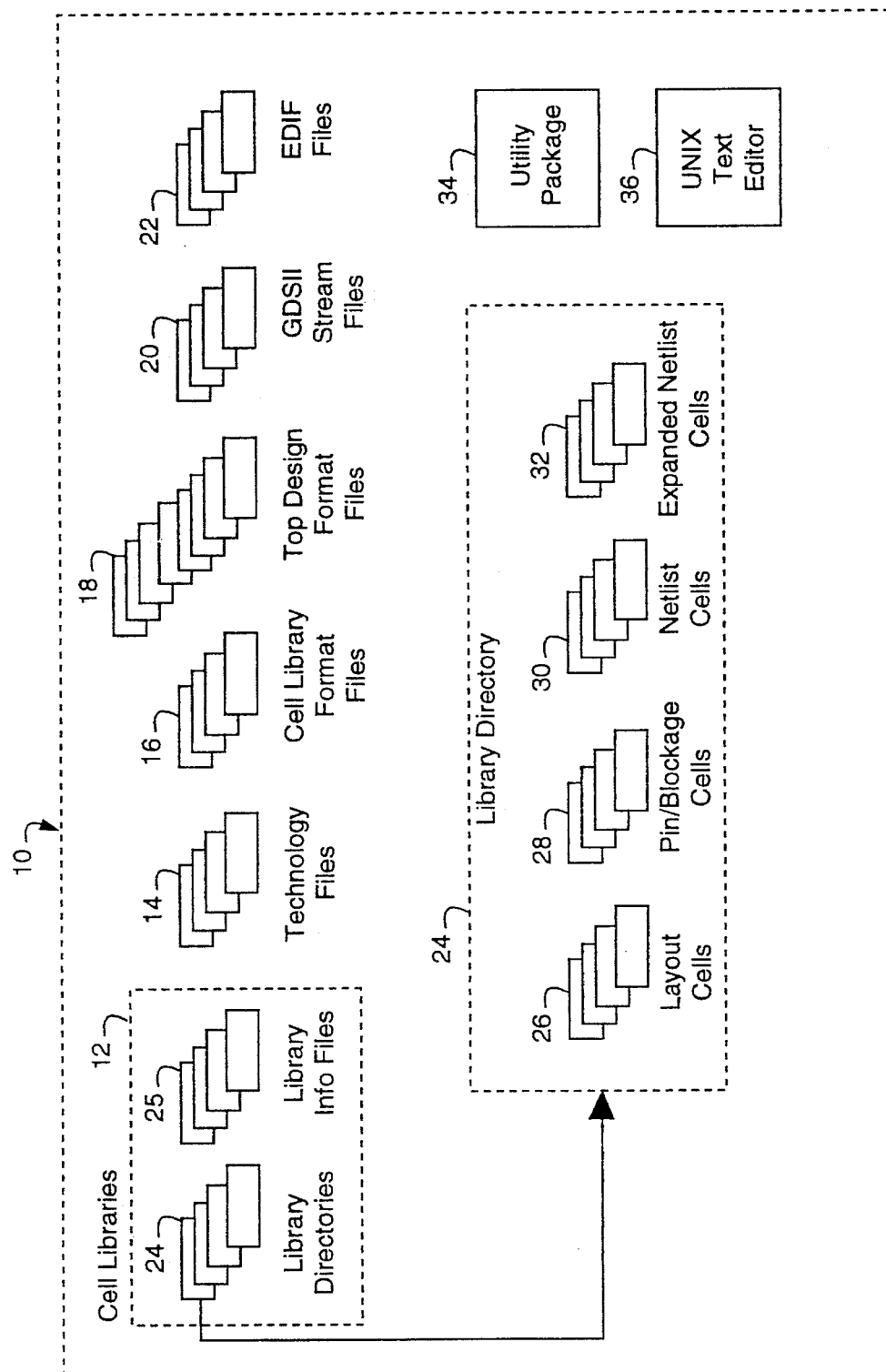
FIG. 1 is a block diagram a directory database for a place-and-route system embodiment of the present invention.

FIG. 1 illustrates a place-and-route system embodiment of the present invention, referred to by general reference numeral 10, for use with semiconductor integrated circuit (IC) designs that contain all standard cells, all blocks or a mixture of standard cells and blocks. System 10 includes in its database structure: a collection of cell libraries 12, at least one technology file 14, a plurality of cell library format files 16, a set of top design format files 18, at least one GDSII stream file and at least one EDIF file. The database of system 10 resides on a suitable computer platform.

Cell libraries 12 include a library directory 24 that is comprised of a plurality of layout cells 26, a plurality of pin/blockage cells 28, a plurality of netlist cells 30 and a plurality of expanded netlist cells 32. Cell libraries 12 also include a library information file 25.

In operation, a user imports a physical layout for a chip-under-design with one of the GDSII files 20 and a list of the wiring interconnections between devices with one of the EDIF files 22, that is informally referred to as a "net" or "netlist".

A utility package 34 provides for library creation and preparation; GDSII stream translation; blockage, pin, and via extraction; EDIF translation and netlist expansion.

System 10 can perform the following functions 10 automatically, with variable user input: floor-planning, including generation of cell regions sufficient to place all standard cells; standard cell placement; power and ground net routing; global routing; detail routing and pad routing. Although these operations can be done with very little user input, they do provide an opportunity for extensive user control. In addition, they can be used in conjunction with the manual capabilities of the system to produce the target results that are required by a user.

System 10 also preferably provides a capability to manually perform the following functions: cell region creation, block placement, pad and cell placement (before and after automatic placement), net routing before and after automatic routing and layout editing.

Verification functions included in system 10 ensure the integrity of a design after manual editing, design rule checking (DRC) and layout versus schematic comparison (LVS).

Utility package 36 allows system 10 to prepare data for export, e.g., GDSII stream translation and EDIF translation.

Cell libraries 12 include both top-level designs and the cells used in those designs. In some cases, cells in a library can include cells from other libraries. Instead of copying cells to multiple libraries, system 10 can reference the other libraries, as "reference libraries". Each library 12 has the library directory 24 that includes two or more binary files for defining each cell in the library. The library information file 25 is a binary file that includes information compiled from technology files 14, cell library format (CLF) files 16, and the cell files 26, 28, 30 and 32 that are inside the library directory 24. Binary files are not edited. A user can, however, change the technology and CLF files 14 and 16 by using utility package 34 to unload and reload these files. When unloading one of these files, utility package 34 places the information in an editable format, so that a user can modify it using a UNIX text editor 36.

Technology files 14 define the characteristics of a cell library, such as units of measure, graphical specifications, layer and device definitions, and design rules. CLF files 16 provide system 10 with library-specific information needed to extract pins and blockage areas, align standard cells, orient pads, and perform timing-driven placement. Top design format (TDF) files 18 are provided for each top-level design in a user's library. System 10 may include at least one TDF file 18, that provides system 10 with special instructions for planning, placing, and routing a design.

System 10 can include design data files in standard formats, e.g., GDSII stream, EDIF and custom. The GDSII stream and EDIF formats are well-known industry-standard interchange formats for transporting designs between different design environments. By using utility package 34, a user can translate GDSII Stream files to or from system 10.

A representation of a design is called a cell. For any design, the possible cells include: layout cells 26, that represent the physical layout of a design; pin/blockage cells 28, that represent the pins, blockage areas (areas where no routing on a particular layer can occur), and possibly via passages (areas where vias can be placed during routing); netlist cells 30, that represent a logical connectivity of a design at a top level of hierarchy; and expanded netlist cells 32, that represent a logical connectivity of a design at enough levels of hierarchy to provide information necessary for binding with a physical layout. Other files, such as backup files, may be created as a user works with system 10.

Figure 2A:
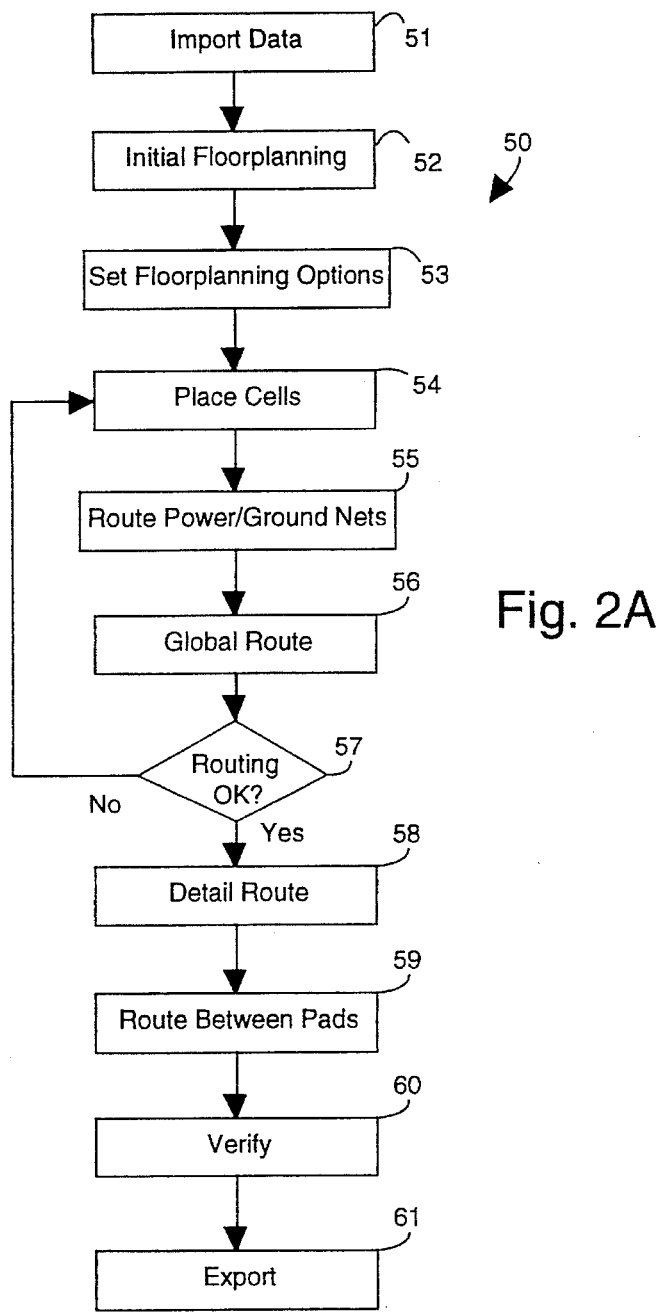
FIG. 2A represents an exemplary high-level design flow for a single-region design comprising only standard cells.

FIG. 2A represents an exemplary high-level design flow 50 for a single-region design comprising only standard cells. Data is imported in a step 51. A step 52 does an initial floor-planning. A step 53 sets the floor-planning options. Cells are placed in a step 54. Power and ground nets are routed in a step 55. A global route is then done in a step 56. A step 57 checks the result of the routing. A detail route is done in a step 58. A route between pads is done in a step 59. The results are verified in a step 60. The results are exported in a step 61, concluding process 50.

Figure 2B:
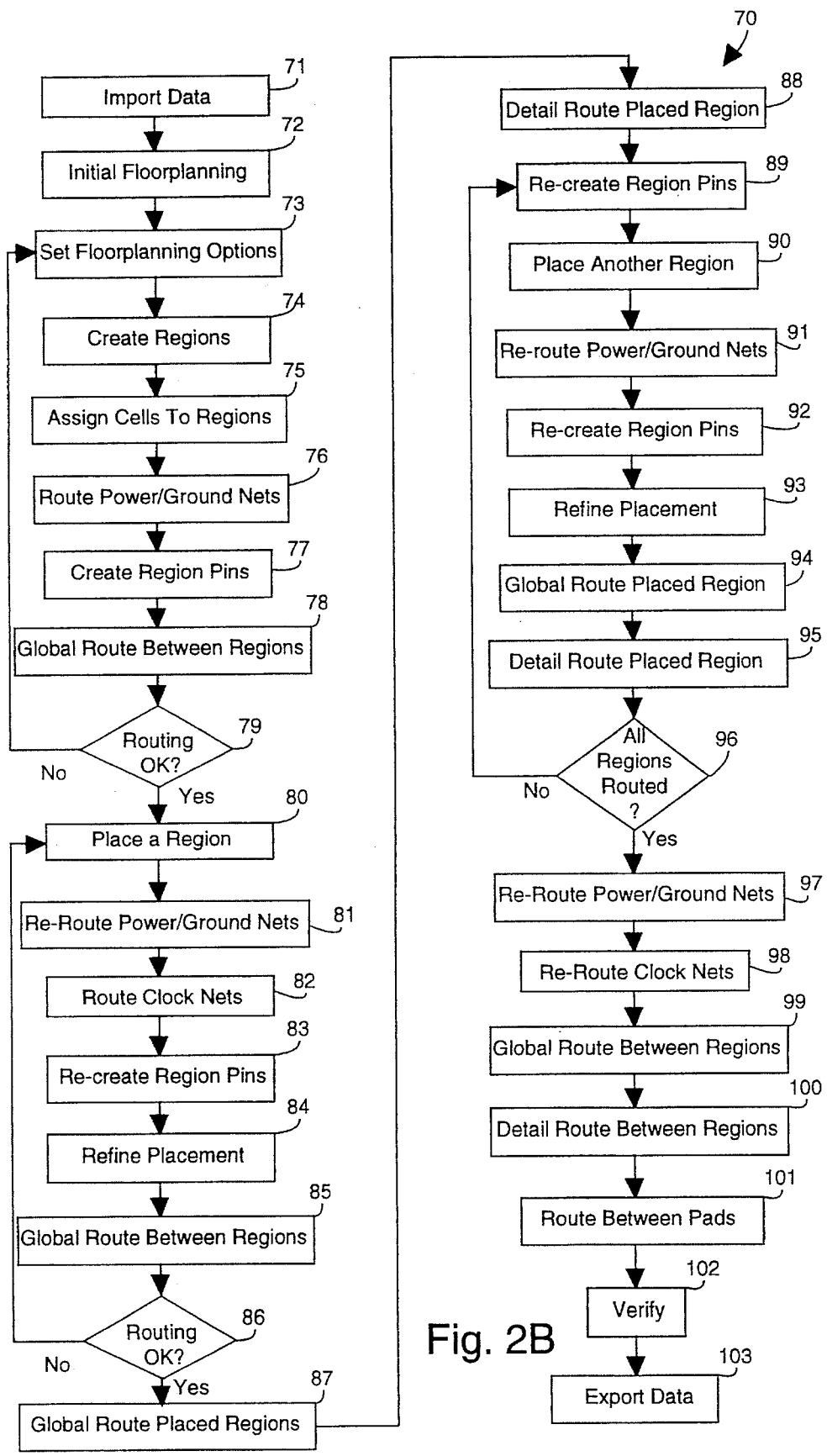
FIG. 2B represents an exemplary high-level design flow for a multiple-region design comprising both blocks and standard cells.

FIG. 2B represents an exemplary high-level design flow 70 for a multiple-region design comprising both blocks and standard cells. Data is imported in a step 71. A step 72 does an initial floor-planning. A step 73 sets the floor-planning options. Regions are created in a step 74. Cells are assigned to regions in a step 75. Power and ground nets are routed in a step 76. Region pins are created in a step 77. A global route between regions is then done in a step 78. A step 79 checks the result of the routing. Steps 78 and 79 may be omitted. A region is placed in a step 80. The power and ground nets are re-routed in a step 81. Clock nets are routed in a step 82. Region pins are re-created in a step 83. The placement is refined in a step 84. A global route between regions is done in a step 85. A step 86 checks to see if the routing was acceptable. Steps 85 and 86 are optional, and may be omitted. A step 87 does a global route between regions. A detail route between regions is done in a step 88. Region pins are re-created in a step 89. Another region is placed in a step 90. Power and ground nets are re-routed in a step 91. Region pins are re-created in a step 92. The placement is refined in a step 93. A global route between the placed regions is done in a step 94. A detail route between placed regions is done in a step 95. A step 96 checks to see if all regions have been routed. If so, a step 97 re-routes the power and ground nets. The clock nets are re-routed in a step 98. A global route between regions is done in a step 99. A detail route between regions is done in a step 100. A route between pads is done in a step 101. The end result is verified in a step 102. The results are exported in a step 103, thus concluding process 70.

For timing-driven placement, a user loads a CLF file 16 containing predefined timing functions. Typically, such functions include:

"definePortCapacitance", which defines the actual capacitance of a port;

"definePortResistance", which defines the actual output resistance of a port;

"defineRampFactor", which defines the ramp factor for an input port, the ramp factor adjusts all delays from a specified input port to all associated output ports;

"defineTimeIn", which specifies the internal delay of a cell between two specified ports; and "setPortDirection", which defines the direction (input, output, or both) of a port.

During placement, system 10 attempts to place cells connected to nets closer together that require faster signal speeds. The nets to be constrained are identified by a user by name, and minimum and maximum values are entered for both rise and fall times. A user may also enter minimum and maximum net capacitance values to constrain the placer.

System 10 provides the following commands to monitor the timing of a user's design as the user proceeds through the design process:

"Timing>Net" reports timing information for a specified net;

"Timing>Path" reports timing information for a specified path; and

"Timing>LPE" reports parasitic information for specified nets.

The "Timing>Net" command reports timing information for a specified net and displays Net Timing in a form on a display screen window. If a user requires pre-routing estimates, a user need to load any CLF timing functions a user want considered and perform placement. If a user want post-routing estimates, a user need to perform routing.

Net timing estimates can be based on placement versus routing, wherein the design phase for which a user wants timing information is selected with a phase options. For example, "before routing" reports estimates based on single-trunk Steiner tree routing, and "after routing" reports estimates based on the actual routing.

Net timing estimates can be based on different calculation models, wherein a model a user wants system 10 to use in calculation of the estimates is selected by a model options. For example, "lump" provides faster but less accurate estimates, and "RC tree" provides slower but more accurate estimates.

The "Timing>Path" command reports timing information for a specified path and displays the path timing in a form on the display screen window. After entering a path name and selecting options, a user clicks "OK" to display the information in a messages area of the window.

A user defines a path using a "pathDelay" TDF file 18 function. Any CLF file 16 timing functions a user wants considered are loaded, and placement is started. Post-routing estimates can follow the routing.

Path timing estimates can be based on placement versus routing, wherein the design phase has phase options that can be selected. For example, "before routing" reports estimates based on single-trunk Steiner tree routing, and "after routing" reports estimates based on the actual routing.

Path timing estimates can be based on different calculation models, wherein a user selects the model system 10 is to use in calculating the estimates. One of the model options are selected, such as "lump" provides faster but less accurate estimates, and "RC tree" provides slower but more accurate estimates.

If a user wants system 10 to highlight a path, a "visible" option and one or both of the following can be chosen, "flash", which causes the path to blink, and "color", which sets the color in which a highlighted path is displayed.

The "Timing>LPE" command reports interconnect parasitic capacitance and resistance for specified nets in the window. After entering a "Net Name" (or multiple net names separated with commas) and selecting options on this form, a user clicks "OK" to display a report in a text window, for example:

---

LPE Report
The lumped RC for net n2316 CAP:
    minFallCap 25.006000
    maxFallCap 25.000000
    minRiseCap 25.000000
    minRiseCap 25.000000
            for RES:
    minFallRes:4000.000000
    maxFallRes:8000.000000
    minRiseRes:4000.000000
    maxRiseRes:4000.000000

The wire length for net n2316 is:
wire length for METAL1:0
wire length for METAL2:0
wire length for METAL3:17
wire Length for POLY:0
number of via(connect METAL1 & METAL2:0
number of via(connect METAL2 & METAL3:0
number of contact(connect POLY & METAL1:0

TREE REPORT FORMAT FOR net:n2316
CO 1 2 L=0 W=0
CO i 2 L=0 W=O
.END

---

When a user requires pre-routing estimates, CLF timing parameters to be considered are loaded before placement. Post-routing estimates can be obtained after routing.

Estimates can be based on placement versus routing, wherein the design phase for which a user want parasitic information is selected by a phase options, e.g., "before routing" and "after routing".

Information included in a report can be selected by a report options. SPICE format reports can also be generated. For example, "lumped RC" reports resistance and capacitance for the specified nets, "lumped wire length" reports wire length for the specified nets, and "SPICE format" reports all information in SPICE format.

FIG. 3 illustrates an exemplary implementation of a timing system 110 included in the place-and-route system 10. Timing system 110 has a clustering process 112 that feeds a zero net (port-to-port) resistive-capacitive (RC) delay to a slack graph generator (SGG) 114. A net constraints file 116 and a complete path constraints file 118 provide SGG 114 with a user's design with constraints. A slack graph is generated and fed to a timing constraint generator (TCG) 120, which computes nodal slacks, edge slacks, arrival time improvements and required time improvements required at particular nodes. A net bounding box generator (NBBG) 122 receives a slack graph and drives a mincut placement process 124, which produces an initial placement that is fed back to a timing calculator 126. An updated slack graph is output by timing calculator 126 to both SGG 114 and TCG 120. A more refined slack graph is output to NBBG 122 which drives a placement process 128. A decision is made in a process 130 whether placement with timing is completed.

A slack graph can also be generated from pin-to-pin timing constraints file 132 (e.g., from TDF file 18) and a system clock specification file 134 (e.g., also from TDF file 18). A timing analyzer 136 merges these inputs to make appropriate adjusts to the slack graphs.

Figure 4A:
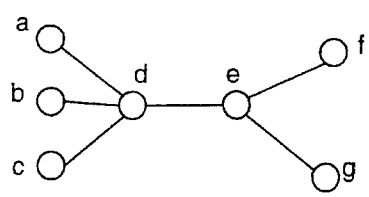
FIG. 4A represents a seven node slack graph.

For purposes of theoretical discussion, Fig. 4A illustrates a network with three input nodes, "a", "b" and "c", a pair of intermediate nodes "d" and "e", and a pair of output nodes "f" and "g". Six constrainable paths can be defined, as follows:

1. path a-d-e- f;
2. path a-d-e-g;
3. path b-d-e- f;
4. path b-d-e-g;
5. path c-d-e-f; and
6. path c-d-e-g.

A-user typically constrains the timing delays of one or more of these six paths or individual legs a-d, b-d, c-d, d-e, e-f and e-g by specifying the corresponding times in file 116 or 118 (Fig. 3). It will usually be the case that one of the paths is critical. A slack graph for the circuit in FIG. 4A can be generated on the same network after calculating particular attributes for the nodes and edges.

Figure 4B:
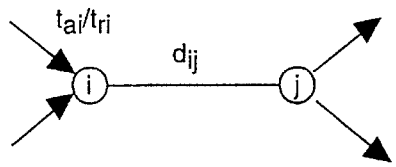
FIG. 4B represents a wire with two nodes.

FIG. 4B illustrates a single wire network with two nodes, "i" and "j". For $node_i$, nodal slack ($s_i$) is defined as the difference between the required (constrained) time of arrival ($t_{ri}$) and the expected arrival time ($t_{ai}$) of a signal, where $s_i = t_{ri} - t_{ai}$. Edge slack ($S_{ij}$) is defined as the difference between the required (constrained) time of arrival ($t_{rj}$) and the expected arrival time ($t_{ai}$) of a signal plus the delay between $node_i$ and $node_j$ ($d_{ij}$), which is expressed, $$S_{ij} = t_{rj} - (t_{ai} + d_{ij}).$$

The arrival time improvement needed at $node_i$ ($x_i$) is therefore the original expected arrival time ($t_{ai}$) minus an updated expected arrival time ($t_{ai}'$), $$(x_i) = (t_{ai}) - (t_{ai}').$$

The required arrival time improvement at $node_j$ ($y_j$) is thus the updated required arrival time ($t_{rj}'$) minus the required arrival time ($t_{rj}$), which typically comes after each cell placement change, and is $$(y_j) = (t_{rj}') - (t_{rj}).$$

The goal is to arrive at the correct timing result after update. The updated arrival time should be no later than the updated arrival time, i.e., $$t_{ai}' \leq t_{ri}'.$$

Without going into excessive detail regarding the optimization process, it can be general concluded that an appropriate optimization process will make an improvement that is exactly equal to the "negative slack" time required for correct timing. Therefore, at $node_i$, $$x_i + y_i = -s_i,$$

30 or, $$y_i = -(x_i + s_i),$$

and at $edge_{ij}$, $$x_i + y_j + \Delta(d_{ij}) = -S_{ij},$$

and eliminating the y variable yields, $$\Delta(d_{ij}) = (x_j + s_j) - (x_i + s_{ij}),$$

where $\Delta(d_{ij})$ is the delay improvement of $edge_{ij}$, to be calculated.

TCG 120 makes such computations for all the nodes described in the net from SGG 114 and understands $d_{ij}$ from both initial and refined placement inputs from processes 112, 124 and 128.

Timing constraint generator 120 determines the edge delay improvement $\Delta d_{ij}$, in an attempt to minimize the sum effect of all placement perturbations relative to previously placed cells. Expressed as a formula, $$\min \sum_{ij} \left( \frac{\Delta d_{ij}}{Ri} \right)^2 = \min \sum_{ij} \frac{1}{Ri^2} [(x_j + s_j) - (x_i + S_{ij})]^2,$$

where Ri is chosen such that $$\frac{\Delta dij}{Ri}$$

is roughly proportional to change in wire length ($\Delta l$) between nodes to achieve the required timing. Ri can be estimated from the driving resistance, loading capacitance and per unit wire capacitance and resistance. This optimization problem can be viewed as a component placement problem in which $x_i$ is the component location, $1/R_i^2$ is the equivalent connectivity $c_{ij}$ between components i and j, and $s_i$, $S_{ij}$ are pin offsets as illustrated in FIG. 5. The optimum edge delay improvement $\Delta d_{ij}$ determined by the timing constraint generator can be used directly as a placement constraint. However, in order to speed placement optimization, the net bounding box generator 122 is used to generate net length constraints from $\Delta d_{ij}$.

Linear programming can be used to solve the whole formulation, but it is not sufficiently effective for practical use. Therefore, a more efficient algorithm such as a quadratic placement optimization algorithm can be used by treating $x_i$ as a cell location, and $s_i$ and $S_{ij}$ as pin offset locations, as shown in FIG. 5.

Boundary conditions of the primary input and output pins are calculated as the following, for each primary input pin $x_i = 0$, and for each primary output pin $x_i = s_i$, where primary input pins are the nodes without input edges, and primary output pins are the nodes without output edges.

To reprocess gate-internal edge and fixed-constraint edge with fixed net constraint, a net "bias" is introduced to simplify the calculation by observing the following equality equation, $$\Delta(d_{ij}) = (x_j + s_j) - (x_i + S_{ij}).$$

By letting the "bias" $B_{ij} = s_j + \Delta(d_{ij}) - S_{ij}$, then $x_j$ may be converted to, $$x_j = x_i + B_{ij}.$$

For a next stage k, $$\begin{aligned} x_k &= x_j + B_{jk} \\ &= x_i + B_{ij} + B_{jk}, \end{aligned}$$

where $B_{jk}$ is defined to be equal to $B_{ij} + B_{jk}$.

An algorithm with four steps that embraces the present invention thus comprises:

(1) calculating net "Dias";

(2) determining boundary conditions of primary input and output pins;

(3) concurrently time marking each source node with an accumulated bias;

(4) determine the optimum $\Delta d_{ij}$.

Representations of the path constraints in traditional timing-driven layout approaches often prove to be the bottlenecks. The number of path constraints in general increases exponentially with respect to the size of the circuit. For larger designs, the volume of path constraints, if listed one by one, could take up so much disk and memory that all path representation becomes impractical. In the present invention, a compact SLACK GRAPH representation is used to hold the all path constraint information as well as to be used as a communication vehicle among different modules of the system. The size of the slack graph is, in general, proportional to the size of the circuit, and thus is very manageable.

Figure 6:
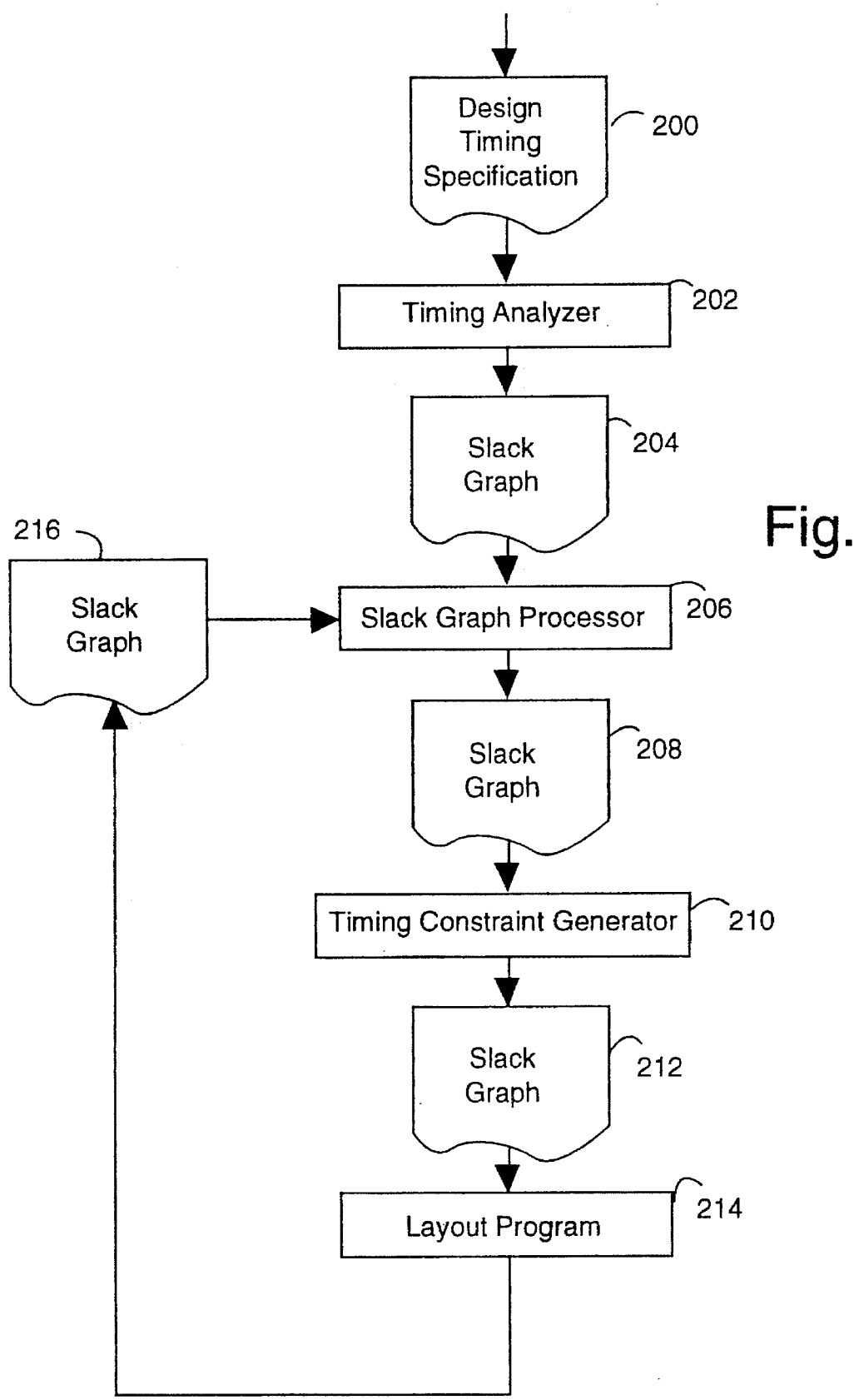
FIG. 6 is a flowchart for a general slack graph based timing-driven layout architecture embodiment of the present invention.

In FIG. 6, a more general timing-driven design architecture using a slack graph is shown. A timing specification 200 for a design is input by a designer to a timing analyzer 202, which then traces the circuit logic and translates this information into a set of path constraints represented by a slack graph 204. The slack graph 204 can be implemented in computer program code, as follows:

```
slack graph struct
{
    numofNode;
    numofEdge;
    node [numofNode];# array of node struct
    edge [numofEdge];# array of edge struct
    numofpathStart;
    numofpathEnd;
    arrivalTime
    startArrivalTime[numofstartArrTime];
    arrivalTime
    endReqArrivalTime[numofEndArrTime];
}
```

First there are the definitions:

node - a connecting point; .provides connectivity from one component to another or within the same component in the design.

edge - a connectivity between to nodes.

and thus, numOfNode—the number of nodes in the design as defined by the slack graph.

numofEdge—the number of edges in the design as defined by the slack graph.

node[numOfNode]—an array of node struct (defined later) storing information pertinent to a node.

edge[numofEdge]—an array of edge struct (defined later) storing information pertinent to an edge.

numOfPathStart—the number of path starting points.

numofPathEnd—the number of path end points.

startArrivalTime[numofStartArrTime]—an array of struct arrivalTime (defined later) storing the arrival time information for path starting point.

endReqArrivalTime[numofmndArrTime]—an array of struct arrivalTime (defined later) storing the required arrival time information for path end points.

The slack graph 204 includes a path topology, e.g., nodes and edges, a set of arrival times at the path starting points and a set of required arrival times at the path end points. The slack graph 204 completely defines the path constraints of the design. The arrival times and the required arrival times can be specified for both the longest delays and the shortest delays. The longest delay is the actual path delays after timing-driven layout cannot be longer than the specified required values. The shortest delay is the actual path delay after timing-driven layout cannot be shorter than the specified required values.

In the following exemplary computer program code, the struct node, edge, and arrivalTime are defined:

```
node    struct {
            componentName;
            pinName;
            slack;
        }
edge    struct {
            fromNode;
            toNode;
            delay;
            minDelay;
            maxDelay;
            slack;
        }
arrivalTime struct {
            node;
            arrivalTime;
        }
```

The slack is defined as the difference between the worst case required arrival time and the worst case actual arrival time. In the case of longest delay, the slack is the difference between the earliest required arrival time and the latest actual arrival time on that node or edge. In the case of shortest delay, the slack is the difference between the latest required arrival time and the earliest actual arrival time on that node or edge.

The delay in the edge struct is used to store the signal propagation delay through that edge. The minDelay and maxDelay are used to constrain the edge delay values during optimization and is equivalent to the traditional net delay constraint.

The arrivalTime can be the longest or the shortest arrival time and they can further be divided into different values for the rising and falling signals.

The slack graph 204 generated by the timing analyzer 202 will respectively have all the topology information and the arrival time and required arrival time information for the path starting and end points. The topology information includes how the nodes are connected through edges and provides the path starting and end points.

This slack graph is then passed to a slack graph processor 206 to store the edge delay values into each edge. The delay values can be either obtained from the component's database, e.g., the "cell library", or calculated based on the current layout information. The graph is then traced to allow the identification of the worst case slacks on each node and edge. There may be multiple slack values on a node or edge depending on the particular path.

As a byproduct, the slack graph processor 206 also identifies the physically infeasible path constraints and can provide early warning to a designer. The physically infeasible path constraint means that no matter how close the components on a path are put together, it is still impossible to meet the required path delay value.

The slack information provides an insight into the overall distribution of the timing resource for the whole design. It identifies the edges that are timing-critical and those that are timing-resourceful and is now ready to be passed on in a slack graph 208 to a timing constraint optimizer 210.

The timing constraint optimizer 210 utilizes a global optimization algorithm to optimize the distribution of the timing resource for the whole design. It takes the edge delays and the node/edge slacks as the initial condition and considers factors like the driving strength and the relative loading of the component/pin, and the min/max edge delay constraints during optimization. Timing constraint optimizer 210 then updates the slack graph with a new set of optimized edge delays that guarantee all the path constraints. After the optimization the timing resource along the most critical paths will be fully utilized while for other non-critical paths, the timing resource will probably be a little under utilized. But for all the paths, there will be none that over utilizes the timing resource derived from the constraint values and thus guarantee the all path constraints.

At this stage, the original path constraints are globally optimized and, base on the current layout status, optimally distributed into net delay constraints. This set of net constraints are generated With a global picture of the design's timing resource, guarantees the path constraints and the traditional net constraints, if any, e.g., the min/max edge delay, and is not a fixed set of constraint values used throughout the layout process. This optimization step is iterated several times during a layout process. Each time taking the advantage of the up-to-date layout status for further optimization.

A slack graph 212 communicates the set of net constraints that are then used by a layout program 214 to guide a layout optimization algorithm. The run time overhead for imposing the net constraints onto the layout algorithm is negligible.

At several break points during the layout optimization process, the layout status, such as component's physical locations, is passed in a slack graph 216 to the slack graph processor 206. The edge delays are re-calculated and the slacks are recalibrated. The flow thus repeats, and the iterations are carried out throughout the layout process.

The real run time overhead for this architecture dependson the slack graph processor 206, the timing constraint optimizer 210 and the number of iterations performed during a layout process. It has been determined that the run times for both the slack graph processor 206 and the timing constraint optimizer 210 are reasonable and are proportional to the size of the design, while the number of iterations required is generally below ten (normally six or seven) for achieving the path constraints physically. It has been observed that the run times are doubled or better, even in designs having all path constraints.

A single slack graph structure is used throughout the process providing communication between the layout algorithm and the timing constraint generator (performing slack distribution). This architecture is very flexible and can be applied to either a partially laid out or even a design that has not been laid out. The same techniques can be applied to other applications for timing optimization, such as sizing, power optimization, timing-driven routing and timing-driven logic synthesis.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electronic design automation tool for the physical circuit design of a semiconductor integrated circuit (IC) chip from circuit and timing requirements, comprising:

a slack graph generator and processor for receiving a list of complete path constraints, a list of net constraints, a list of current-iteration edge delays, and for outputting for subsequent timing constraint generation a plurality of slack graphs with current-iteration slack values that represent a particular tentative physical placement of circuit nodes on said IC chip and their consequential signal propagation distances from one another expressed in time;

a timing calculator for receiving an initial placement information for the physical location of said circuit nodes on said IC chip and a refined placement information from a placer, and for calculating said list of current-iteration edge delays given said particular tentative physical placement of said circuit nodes;

a timing analyzer for receiving a set of specifications for system clocking, a list of combinational pin-to-pin constraints, a list of net constraints, and for outputting a plurality of slack graphs during an initialization stage in lieu of said slack graphs from the slack graph generator and processor, wherein each of said slack graphs represent a particular tentative physical placement of circuit nodes on said IC chip and their consequential signal propagation distances from one another expressed in time;

a timing constraint generator for generating a composite slack graph from slack graph inputs from the timing calculator, the slack graph generator and processor and the timing analyzer and including optimization means for minimizing a sum effect of all placement perturbations of the tentative physical to previously physically placed cells on said IC chip, expressed in formula form as:

$$\min \sum_{ij} \left( \frac{\Delta d_{ij}}{R_i} \right)^2 = \min \sum_{ij} \frac{1}{R_i^2} [(x_j + s_j) - (x_i + S_{ij})]^2,$$

where $$\frac{\Delta d_{ij}}{R_i}$$

is roughly proportional to a change in wire length ($\Delta l$) between nodes to achieve the required timing, $R_i$ is estimated from the driving resistance, loading capacitance and per unit wire capacitance and resistance, such optimization being viewed as a component placement problem in which $x_j$, $x_i$ is the component location, $1/R_i^2$ is the equivalent connectivity $c_{ij}$ between components i and j, and $s_j$, $S_{ij}$ are pin offsets and the optimum edge delay improvement $\Delta d_{ij}$, as determined by the timing constraint generator, is used directly as a placement constraint; and a net bounding box generator for inputting said composite slack graph and for converting delay constraints into placement constraints to drive a placement process in said placer on an iterative basis, wherein the net bounding box generator generates net length constraints from $\Delta d_{ij}$ for speed placement optimization;

wherein a last modified one of said slack graphs represents an ultimate description of the physical placement of circuit nodes that satisfies an input circuit design netlist and timing requirement.

2. An electronic design automation tool for the design of a semiconductor integrated circuit chip, comprising:

a slack graph having data storage for a plurality of representations for a netlist with nodes and edges between nodes, netlist connectivity of said nodes required to form a circuit, edge delay times, next target edge delays and slack times for edges and nodes, wherein the edge slack time is the difference between a required signal arrival time at a destination node and the sum of actual signal arrival times at a source node and an edge delay, and the node slack time is the difference between actual signal arrival time, given the current placement iteration, and target signal arrival time at a node;

a first iterative optimizer means including a placer connected to receive a plurality of next-target edge delays from the slack graph for adjusting a representation of the physical placement of said nodes, wherein said placement affects said edge delay times with a placer objective of achieving said next target edge delays between said placed nodes;

a timing calculator connected to receive a current-iteration physical node placement information from the placer for calculating the resulting edge delay times between said place-adjusted nodes;

a slack graph generator and processor connected to receive said calculated edge delay times from the timing calculator and for annotating and updating said slack graph edge delay times with said current-iteration calculated edge delay times and for correspondingly adjusting said slack time representations; and a second iterative optimizer means including a timing constraint generator connected to receive said slack graph from the slack graph generator and processor for timing resource allocation by comparing an overall netlist design delay to an overall circuit delay computed from accumulated edge delay times of said current-iteration physical node placement information and, based on said comparison, for generating to the slack graph a new set of said target edge delays for recirculation through the slack graph to the placer for a next iteration, and wherein timing constraints on each of a plurality of nodes and a plurality of edge delays between said each of said nodes are individually pre-computed and represented as slack and an arrival time improvement is computed for each;

wherein the first and second iterative optimizers respectively optimize placement and optimize intermediate edge delays on a global, overall circuit design level.

3. The tool of claim 2, further comprising:

a complete path constraints file means connected to provide an input of a user's design with constraints to the slack graph generator and processor, wherein an initial data set of said representations is generated and loaded into the slack graph, which, in turn, is fed for the first time to the timing constraint generator.

4. The tool of claim 3, further comprising:

a net constraints file means connected to provide an input of a user's design with constraints to the slack graph generator and processor.

5. The tool of claim 2, further comprising:

a net bounding box generator connected to receive said slack graphs from the timing constraint generator for converting target edge delays into placement constraints and to the placer for producing a placement for a next iteration.

6. The tool of claim 2, further comprising:

a timing analyzer for merging input information from included system clock specification file means and pin-to-pin timing constraints file means and for generating an initial data set of said representations to said slack graph and the timing constraint generator.

7. An electronic design automation tool for the physical circuit design of a semiconductor integrated circuit (IC) chip from circuit and timing requirements, comprising:

a slack graph generator and processor for receiving a list of complete path constraints, a list of net constraints, a list of current-iteration edge delays, and for outputting for subsequent timing constraint generation a plurality of slack graphs with current-iteration slack values that represent a particular tentative physical placement of circuit nodes on said IC chip and their consequential signal propagation distances from one another expressed in time;

a timing calculator for receiving an initial placement information for the physical location of said circuit nodes on said IC chip and a refined placement information from a placer, and for calculating said list of current-iteration edge delays given said particular tentative physical placement of said circuit nodes;

a timing analyzer for receiving a set of specifications for system clocking, a list of combinational pin-to-pin constraints, a list of net constraints, and for outputting a plurality of slack graphs during an initialization stage in lieu of said slack graphs from the slack graph generator and processor, wherein each of said slack graphs represent a particular tentative physical placement of circuit nodes on said IC chip and their consequential signal propagation distances from one another expressed in time; and a timing constraint generator for generating a composite slack graph from slack graph inputs from the timing calculator, the slack graph generator and processor and the timing analyzer and including optimization means for minimizing a sum effect of all placement perturbations of the tentative physical to previously physically placed cells on said IC chip, expressed in formula form as:

$$\min \sum_{ij} \left( \frac{\Delta d_{ij}}{R_i} \right)^2 = \min \sum_{ij} \frac{1}{R_i^2} [(x_j + s_j) - (x_i + S_{ij})]^2,$$

where $$\frac{\Delta d_{ij}}{R_i}$$

where is roughly proportional to a change in wire length ($\Delta l$) between nodes to achieve the required timing, $R_i$ is estimated from the driving resistance, loading capacitance and per unit wire capacitance and resistance, such optimization being viewed as a component placement problem in which $x_i$, $x_j$ is the component location, $1/R_i^2$ is the equivalent connectivity $c_{ij}$ between components i and j, and $s_j$, $s_{ij}$ are pin offsets and the optimum edge delay improvement $\Delta d_{ij}$, as determined by the timing constraint generator, is used directly as a placement constraint;

wherein a last modified one of said slack graphs represents an ultimate description of the physical placement of circuit nodes that satisfies an input circuit design netlist and timing requirement.

* * * * *